US010671040B2

(12) United States Patent
Drumm et al.

(10) Patent No.: US 10,671,040 B2
(45) Date of Patent: Jun. 2, 2020

(54) PROCESS CONTROL SYSTEM AND PLANT PLANNING TOOL

(71) Applicant: Siemens Aktiengesellschaft, Munich (DE)

(72) Inventors: Oliver Drumm, Eggenstein-Leopoldshafen (DE); Benjamin Lutz, Pfinztal (DE); Gerrit Wolf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 15/839,383

(22) Filed: Dec. 12, 2017

(65) Prior Publication Data

US 2018/0173183 A1 Jun. 21, 2018

(30) Foreign Application Priority Data

Dec. 16, 2016 (EP) ..................................... 16204636

(51) Int. Cl.
*G05B 19/042* (2006.01)
*G05B 19/05* (2006.01)
(Continued)

(52) U.S. Cl.
CPC ....... *G05B 19/0426* (2013.01); *G05B 19/056* (2013.01); *G05B 19/4069* (2013.01);
(Continued)

(58) Field of Classification Search
CPC ............ G05B 19/0426; G05B 19/4069; G05B 19/418; G05B 19/056; G05B 2219/32337; G05B 2219/23445; G05B 2219/25428; G05B 2219/25014; G05B 2219/31121; G05B 2219/23054; Y02P 90/26; Y02P 90/02; Y02P 90/20
See application file for complete search history.

(56) References Cited

U.S. PATENT DOCUMENTS 7,474,929 B2 * 1/2009 Nixon .................. G05B 19/042
700/275
9,130,980 B2 * 9/2015 Law .................... H04L 63/1416
(Continued)

FOREIGN PATENT DOCUMENTS

WO WO2004/042482 5/2004

OTHER PUBLICATIONS

SIEMENS: "SIMATIC PCS 7 Process Control System, System components" siemens.com/simatic-pcs7 Catalog ST PCS 7, Chapter 4, Edition 2016; 2016.
(Continued)

*Primary Examiner* — Charles R Kasenge
(74) *Attorney, Agent, or Firm* — Cozen O'Connor

(57) ABSTRACT

A process control system includes an engineering system for planning automation components into the project for a technical plant, a simulation framework for modeling the process behavior of field devices, a simulation unit for virtualizing the communication behavior of the real field devices and also includes a plant planning tool for planning the process engineering components of the plant into the project by which the commissioning of field-related components and a secure commissioning of a process engineering plant are made possible.

6 Claims, 5 Drawing Sheets

(51) Int. Cl.
   *G05B 19/418* (2006.01)
   *G05B 19/4069* (2006.01)
(52) U.S. Cl.
   CPC .. *G05B 19/418* (2013.01); *G05B 2219/23054* (2013.01); *G05B 2219/23445* (2013.01); *G05B 2219/25014* (2013.01); *G05B 2219/25428* (2013.01); *G05B 2219/31121* (2013.01); *G05B 2219/32337* (2013.01); *Y02P 90/02* (2015.11); *Y02P 90/20* (2015.11); *Y02P 90/26* (2015.11)

(56) References Cited

U.S. PATENT DOCUMENTS

| | | | |
|---|---|---|---|
| 2004/0193287 A1 | 9/2004 | Lefebvre et al. | |
| 2007/0179645 A1* | 8/2007 | Nixon | G05B 19/042 700/83 |
| 2008/0177396 A1* | 7/2008 | Hansen | G05B 19/054 700/1 |
| 2008/0211660 A1* | 9/2008 | Takeuchi | G05B 19/0428 340/514 |
| 2008/0312757 A9* | 12/2008 | Nixon | G05B 19/042 700/83 |
| 2011/0072506 A1* | 3/2011 | Law | H04L 63/0227 726/11 |
| 2018/0032651 A1* | 2/2018 | Snyder | G06F 17/5004 |

OTHER PUBLICATIONS

Katalog_STP CS 7T_2016 Siemens-Katalog „ST PCS 7 T, Chapter 8, Edition 2016.

Siemens-Dokument "Schnelle und einfache Erstellung von Rohrleitungs- und Instrumentierungsschema mit COMOS P&ID am praktischen Beispiel, COMOS V10.1, Anwendungsbeispiel Jul. 2016".

Anonymous: "Prozessleitsystem SIMATIC PCS 7-Systemkomponenten", Edition 201, pp. 4/1-4/18, 8/1-8/41.

* cited by examiner

FIG 3

- ◁ A10 Plant part
  - +🗎 FB.001 R&I flow scheme acc. to EN 10628, DIN A3
  - +🗀 A10 Equipment
  - +🗀 A20 Machines
  - +🗀 A30 Valves
  - +🗀 A40 Pipes
  - -🗀 A50 E1&C
    - 23〜- ⊠ 002 Pressure position
    - 23〜 +🄿 P Pressure
    - 23〜- ⊠ 003 Level position
    - 23〜 +🄻 L Level
    - 23〜- ⊠ 004 Throughflow position
    - 23〜 +🄵 F Throughflow, throughput
    - 23〜- ⊠ 005 Actuators position
    - 23〜 +🅈 Y Actuators
    - 23〜- ⊠ 006 Temperature position
    - 23〜 +🄣 T Temperature
  - +🗀 A60 Special equipment
  - +🗀 A70 Conveyor means

- ⊠ 01 Simulation unit 〜24
  - + 🄿 P Pressure 〜27
  - + 🄣 T Temperature 〜27
- ⊠ 02 Simulation unit 〜25
  - + 🄵 F Throughflow, throughput
  - + 🄻 L Level
  - + 🅈 Y Actuators ⎬28
- ⊠ 03 Simulation unit 〜26

- ☒ 01 Simulation unit —24
  + ⌕P  P Pressure —27
  + ⌕T  T Temperature —27
- ☒ 02 Simulation unit —25
  + ⌕F  F Throughflow, throughput
  + ⌕L  L Level
  + ⌕Y  Y Actuators —28
- ☒ 03 Simulation unit —26

✓ —31
✓ —31
● —29
✗ —30
✓ —31
✗ —30
● —29
✓ —31

} Change of allocation —32

29 — ● Real device
30 — ✗ Error or overload during simulation
31 — ✓ Simulation in order

PROCESS CONTROL SYSTEM AND PLANT PLANNING TOOL

BACKGROUND OF THE INVENTION

1. Field of the Invention

The invention relates to a process control system and to a plant planning tool suitable for the process control system.

2. Description of the Related Art

An engineering system is known from the Siemens Catalog "ST PCS7", Chapter 4, 2016 Edition, which is intended for project planning or for engineering of automation components of a plant, e.g., components in the form of network, communication and hardware components and also in the form of control programs (automation). Hardware components of this type are, e.g., automation devices or programmable logic controllers (SPC, PLC) as well as field devices, which are connected to a controller via a bus.

A simulation tool is disclosed in Siemens Catalog "ST PCS 7 T", Chapter 8, 2016 Edition, which makes a real-time simulation of automation solutions possible. This simulation tool comprises a simulation framework, which simulates the process behavior of the field device level, and a simulation unit, which simulates the communication behavior of the real field devices, where this simulation unit further binds the modeled process behavior to the controller.

Over and above this, a further software tool for creating a piping and instrumentation flow diagram (P&I flow scheme, piping and instrumentation flow scheme) for a technical plant to be controlled is known from the Siemens document "Fast and easy generation of Piping and Instrumentation Diagrams with COMOS P&ID using a practical example, COMOS V10.1, Application Example July 2016". This software tool is an element of a plant planning tool, which is intended for process engineering plant planning.

The plant planning tool, on the one hand, and the simulation tool, in particular the simulation unit of this simulation tool, on the other hand, do not interact with each other, which means that the engineering of the simulation is detached from the engineering of the process engineering plant planning process, which has a disadvantageous effect on the commissioning of the process engineering plant.

SUMMARY OF THE INVENTION

In view of the foregoing, it is therefore an object of the invention to provide a process control system that is suitable for commissioning of field-related components, as well as a plant planning tool suitable for a process control system of this type.

These and other objects and advantages are achieved in accordance with the invention by a process control system and plant planning tool, wherein by a logical combination or "linking" of this type, a step-by-step and secure commissioning of a process engineering plant is advantageously made possible, and wherein the commissioning with virtual plant components is an element of the plant planning. With the plant planning tool, the state of the commissioning can be verified, where it can be verified at any time which process engineering plant components are still virtualized and which are already real and bound to the controllers. Over and above this, an end-to-end engineering of the process engineering plant, including taking account of simulation aspects, is made possible.

In an embodiment, a user can make a logical link in a simple manner.

In a further embodiment of the invention, the at least one simulation unit, during its commissioning, transfers its status and/or the status of the virtual field devices to the plant planning tool, through which the current status of the simulation unit—and also the results of the commissioning—can be read back again into the plant planning tool.

In that the plant planning tool is configured to display the status in the piping and instrumentation diagram and/or to display this status in a device hierarchy overview, the user is able to recognize which virtual field devices or Process Control Technology (PCT) positions are error-free during the commissioning and which have errors or are overloaded.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and also benefits will be explained in greater detail below on the basis of the drawing, in which an exemplary embodiment of the invention is illustrated, in which:

FIGS. 3 and 4 diagrams illustrating device hierarchy overviews in accordance with the invention.

DETAILED DESCRIPTION OF THE EXEMPLARY EMBODIMENTS

The parts that are the same shown in FIGS. 1 to 5 are provided with the same reference numbers.

Figure 1:
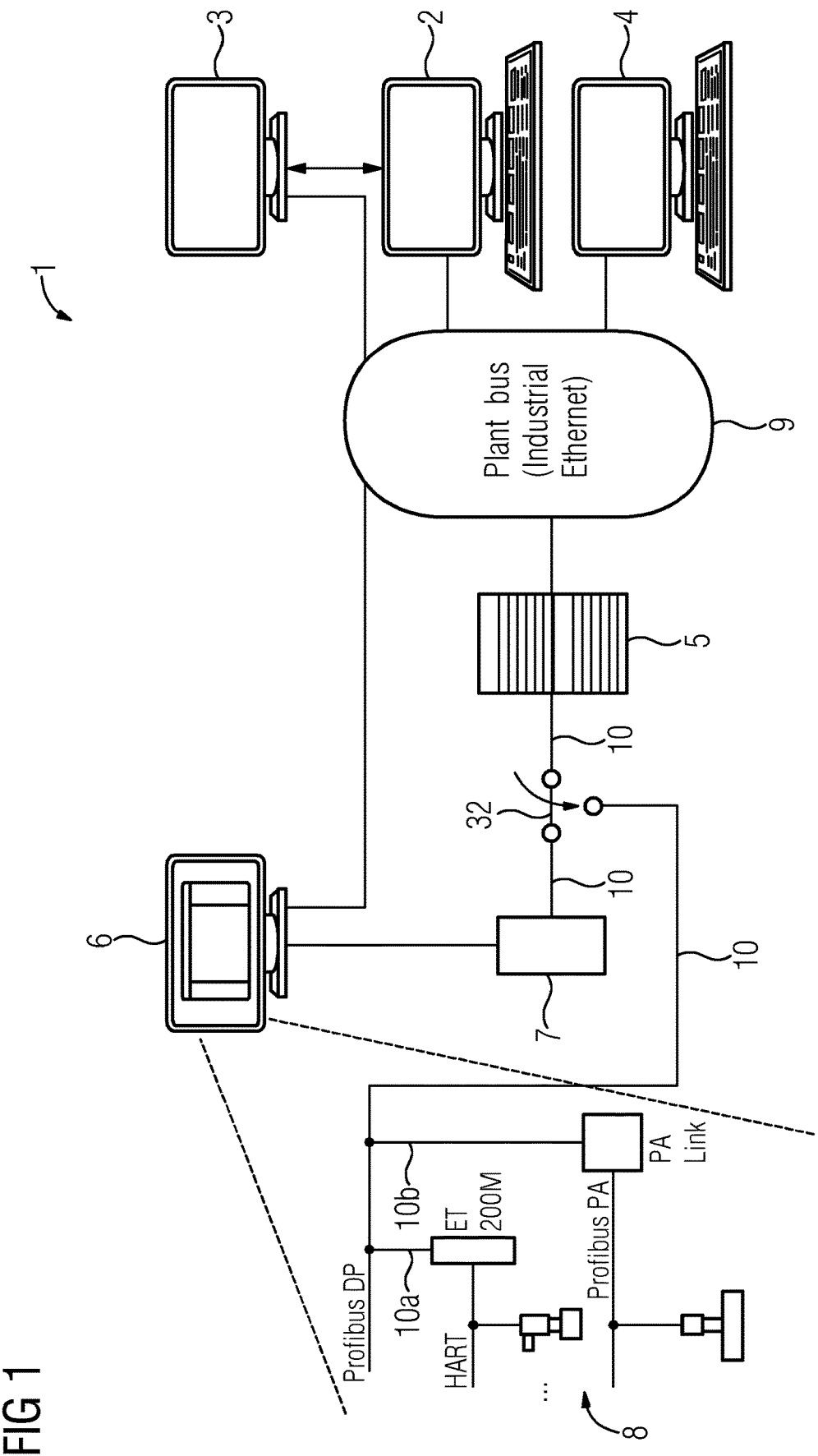
FIG. 1 is a schematic block diagram illustrating elements of a process control system in accordance with the invention.

In FIG. 1, the number 1 designates elements of a process control system, which in the present exemplary embodiment are an engineering system 2, a plant planning tool 3, an operator station 4, a controller or automation device 5, a simulation tool 6, 7 as well as a field device level 8. The process control system 1 can naturally have a plurality of controllers 5, which are connected on one side via a plant bus 9 to the engineering system 2, the plant planning tool 3 and also the operator station 4 and on the other side via a further bus 10, e.g., the called PROFIBUS DP, to the field device level 8. The field device level 8 has a plurality of field devices, where actuators and sensors are connected to "decentralized peripherals" and/or bus couplers of this field device level 8. Which and how many of the controllers and field devices and also, which further automation components will be used for controlling a plant, is dependent on the automation task to be solved, where a user creates a control program for the controller 5 via the engineering system 2 provided with suitable software and plans automation components into the project or engineers them accordingly.

The simulation tool 6, 7 comprises a simulation framework 6 and at least one simulation unit 7, where a user creates at least one model via the simulation framework 6, which virtualizes or simulates the process behavior of the field device level 8 (indicated in the drawing by dashed lines). The simulation unit 7 is configured to virtualize or to simulate the communication behavior of the real field devices of the field level 8 and is additionally configured to bind the process model created by the simulation framework 6 via the bus 10 to the controller 5. In this "virtualization" operating mode, the simulation unit 7 is connected to the controller 5 and the real field level is disconnected from the controller 5, which is indicated by a switch 32 in the drawing. In the present exemplary embodiment, only one simulation unit 7 is provided for the field device level 8. It should be understood a simulation unit can be used for each branch 10*a*, 10*b* of the bus 10, where a user plans the number of simulation units into the project via the engineering system 2 or via the plant planning tool 3. The engineering system 2 transfers the addresses of the field devices, which are stored in "device description files" of the field devices, for example, to each simulation unit as well as to the simulation framework 6 and the plant planning tool 3, where these files will be read out by the engineering system 2 and stored in this system.

With the plant planning tool 3 for process engineering plant planning, the user creates a piping and instrumentation flow diagram (P&I flow scheme, piping and instrumentation scheme) for the project planning of the technical plant. The plant planning tool 3 has a class "simulation unit", from which entities "simulation unit 1, simulation unit 2, . . . " can be formed or set up. In the event of there being two simulation units to be planned into the project, for example, the plant planning tool 3 creates a first and a second entity, e.g. the entities "simulation unit 1" and "simulation unit 2" from a "simulation unit" class.

The field devices are assigned to one of the entities in a manner in which a user first identifies, via a suitable operating input, a symbol or an image object of one of the field devices in the piping and instrumentation diagram and (by a further input for example) assigns it to the entity. In this way, the plant planning tool 3 automatically links the address of the field device that will be represented by the symbol to the simulation unit that will be represented by an entity. This means that the simulation unit is "integrated" into the plant planning tool 3 and it is thereby already made possible in the process engineering planning to also take account of a corresponding virtualization and also to (dynamically) change and maintain it during the further course of planning.

Figure 2:
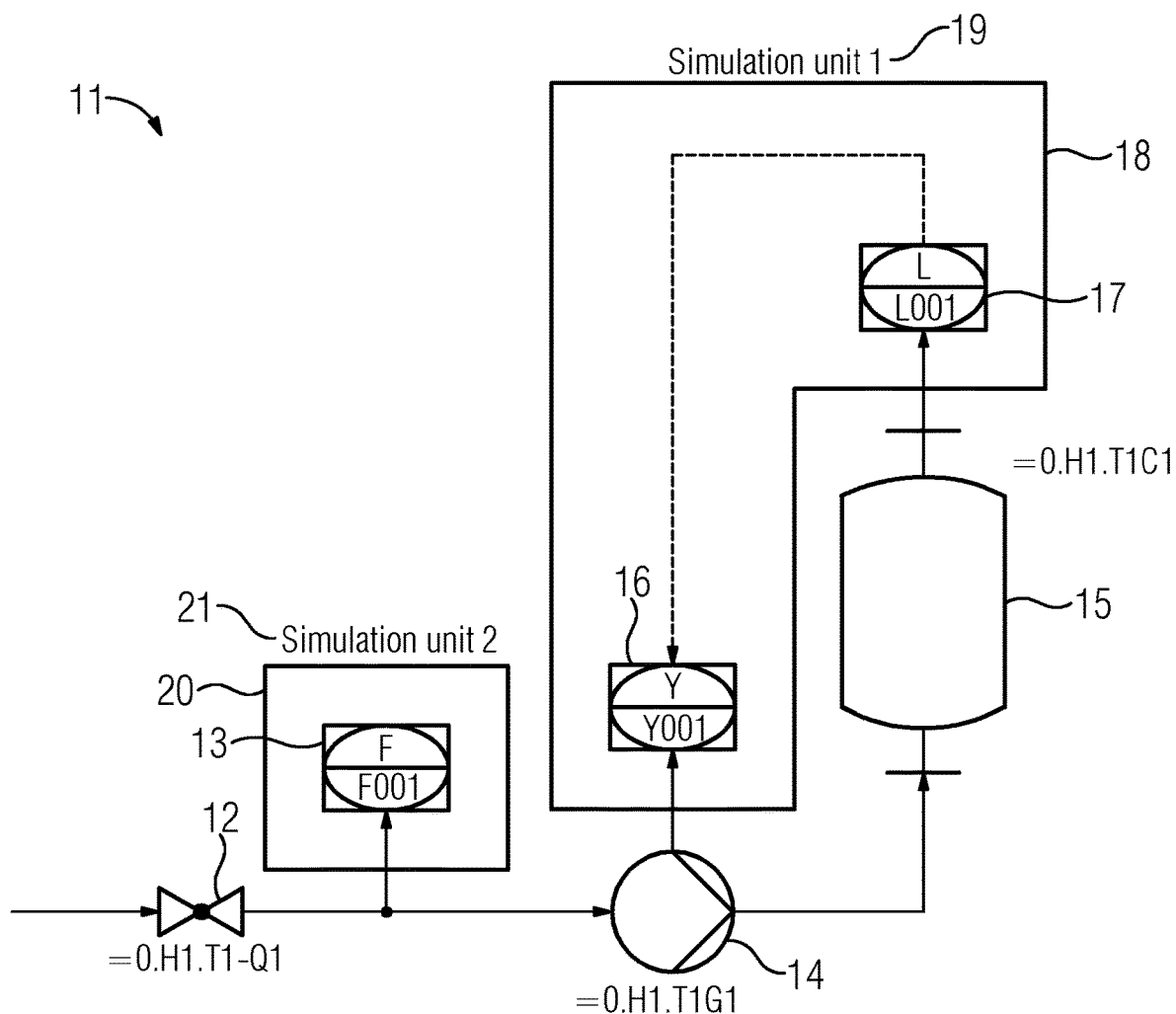
FIGS. 2 and 5 are schematic block diagrams illustrating piping and instrumentation diagrams in accordance with the invention.

Reference is made below to FIG. 2, in which a piping and instrumentation diagram 11, which a user has created via the plant planning tool 3, is shown. This diagram has symbols 12 to 17, which represent field devices or PCT (process control technology) points of a field device level. In the present exemplary embodiment, the symbols 16, 17 are identified or marked by an outline 18, where these symbols 16, 17 or this outline 18 are allocated to a first simulation unit entity 19, which represents a real first simulation unit able to be connected to the bus 10 (FIG. 1). Furthermore, a second simulation unit entity 21, which represents a real second simulation unit likewise able to be connected to the bus 10 (FIG. 1), is allocated to the symbol 13 or to a frame 20.

So that the user can uniquely recognize the assignments made between the field devices or PCT positions and the simulation units, the plant planning tool creates device hierarchy overviews. These overviews show the user (without them having to open the piping and instrumentation diagram) the simulated and real PCT positions and their assignments to the simulation units.

For a more detailed explanation the reader is referred at this point to FIGS. 3 and 4, in which it is illustrated which parts of the process engineering plant are virtualized by particular simulation units.

By way of example, FIG. 3 shows a device hierarchy overview 22 of part of a plant, where this overview 22 shows designations and labels that represent real and virtual field devices of PCT positions as well as simulation units for this part of the plant. For the sake of simplicity, for the terms "designations and labels" below, the terms that will be represented by these "designations and labels", i.e., the terms "real field devices or PCT positions", "virtual field devices or PCT positions" and "simulation units" will be used.

In the present example, the user is shown by this device hierarchy overview 22 which real PCT positions 23 and which simulation units the plant part comprises and, over and above this, which of the real PCT positions 23 will be simulated by which simulation unit 24, 25, 26, where the PCT positions listed in the simulation units 24 to 26 are formed as virtual PCT positions, which each represent a real PCT position. For example, the simulation unit 24 has two virtual PCT positions 27, which are assigned to the corresponding real PCT positions. The simulation unit 25 is further provided with three virtual PCT positions 28, which are likewise assigned to the corresponding real PCT positions. The further simulation unit 27 is intended as a reserve simulation unit, to which no PCT positions are yet assigned.

After the assignment and allocation of the field devices or PCT positions to the simulation units, after the loading of the control program into the controller 5 and the installation or the connection of the simulation units to the bus and also after the loading of the behavior model, at run time (controller 5 in RUN mode), the field-related components (field device level, field devices, PCT positions) can be put into operation virtually and tested. In such cases, the simulation units virtualize the field level and the process behavior of the field-related components will be reflected by the at least one (behavior) model in the simulation framework 6. The user can gradually put the virtual components into operation in accordance with a commissioning plan and in the event of no errors occurring, can gradually replace the virtual components by the real components. The simulation units are configured so as to notify the plant planning tool 3 as to which virtual components are error-free or affected by errors. This means that the simulation units always transfer or notify their current statuses or their virtual components to this plant planning tool 3.

In the event of an error occurring during the simulation, e.g., because of an overload or an error of a virtual component of a simulation unit, the user can allocate this component to another simulation unit in the device hierarchy overview 22 via a suitable operator input, e.g., via a "Cut&Paste" or "Drag&Drop" input. This means that the corresponding component will be relocated to the other simulation unit, where the plant planning tool 3 accepts this change automatically into the piping and instrumentation diagram.

For a more detailed explanation with respect to such a relocation, the reader is referred below to FIGS. 4 and 5. FIG. 4 shows a section of the device hierarchy overview 22 (FIG. 3), in which the simulation units 24, 25, 26 and the virtualized PCT positions 27, 28 are shown. In this case it is assumed that two virtual PCT positions have already been replaced by real PCT positions during commissioning, which is displayed to the user by a suitable marking 29. This user will further be shown, by a further marking 30, 31, which virtual PCT positions are error-free during commissioning and which are subject to errors or are overloaded. In the present example, the virtual PCT position 28a of the simulation unit 25 has an error. In order to rectify this error, the user moves this PCT position 28 into the simulation unit 24, which is indicated in the drawing by the arrow 32.

Figure 5:
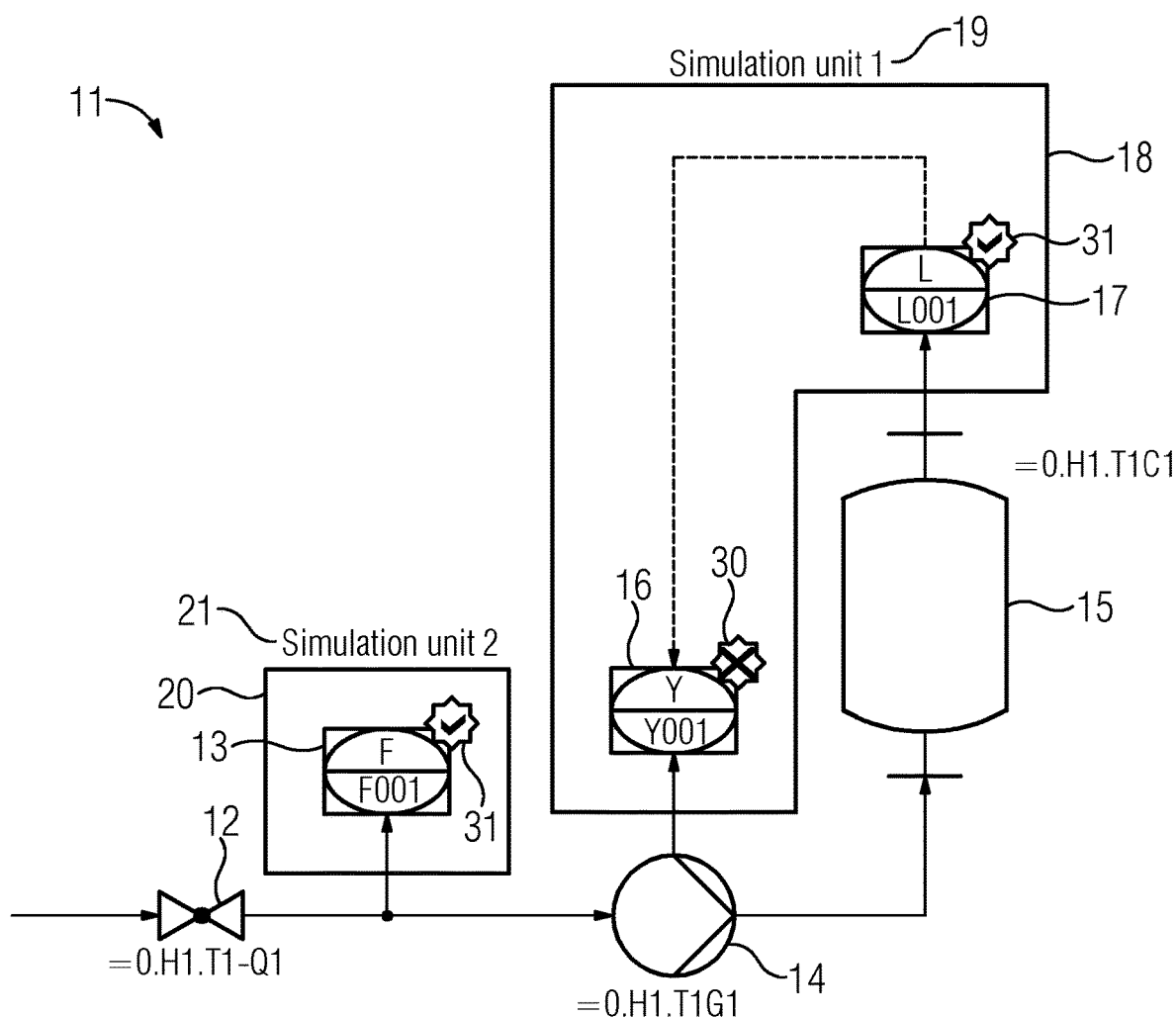

In order to also recognize both the error-free and also the errored or overloaded virtual PCT positions in the piping and instrumentation diagram, the plant planning tool causes these statuses shown in the device hierarchy overview 22 to be notified back to the diagram and displayed (see FIG. 5).

As is described, the virtual components for the commissioning can be brought "into the field" by the plant planning tool and conversely the current status of the simulation units (and also the results of the commissioning) can be read back into the plant planning tool. This process is thus bidirectional, where it is advantageous that the status of the commissioning is reflected. It can be derived from this how the commissioning process is running or can be extrapolated as to when the commissioning will be finished. Also the knowledge obtained during the commissioning can be documented on these objects in the plant planning tool. This documentation can serve, during later expansions of the automation, to insert these at a suitable point and not at points that were already overloaded in the past during the commissioning.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process control system comprising:
    an engineering system for planning automation components into a project for a technical plant, the automation components having a plurality of controllers and field devices connected to said plurality of controllers to which field device addresses are allocated, for creating at least one control program and for loading the control program into at least one controller of the plurality of controllers;
    a simulation framework for modeling a process behavior of the field devices;
    at least one simulation unit for virtualizing a communication behavior of real field devices and for binding a modeled process behavior to the plurality of controllers, during a virtualization operating mode the at least one simulation unit being connected to the at least one controller of the plurality of controllers and the field devices being disconnected from the at least one controller of the plurality of controllers via a switch; and
    a plant planning tool for planning process engineering components of the technical plant into the project, a user creating a piping and instrumentation diagram, which comprises symbols for the real field devices, via the plant planning tool;
    wherein the engineering system is configured to transfer field device addresses to the plant planning tool and the plant planning tool is configured to logically link at least one field of the field devices to the at least one simulation unit; and
    wherein the plant planning tool assigns an address of the at least one field device to the at least one simulation unit; and
    wherein the plurality of controllers, on one side, are directly connected via a bus system to the engineering system, the plant planning tool and an operator station and, on another side, are connected via a further bus to field level devices connected to the switch.

2. The process control system as claimed in claim 1, wherein the logical linkage is initiated by a user marking, via a user input, a symbol or an image object of the at least one field device in the piping and instrumentation diagram, the plant planning tool assigning the address of the at least one field device to the at least one simulation unit as a result of the marking.

3. The process control system as claimed by claim 1, wherein the at least one simulation unit is configured to transfer at least one of (i) a status of the at least one simulation unit and (ii) a status of virtual field devices to the plant planning tool during commissioning.

4. The process control system as claimed by claim 2, wherein the at least one simulation unit is configured to transfer at least one of (i) a status of the at least one simulation unit and (ii) a status of virtual field devices to the plant planning tool during commissioning.

5. The process control system as claimed in claim 3, wherein the plant planning tool is configured to display the status in at least one of (i) the piping and instrumentation diagram and (ii) a device hierarchy overview.

6. A plant planning tool configured for the process control system as claimed in claim 1.

\* \* \* \* \*